United States Patent Office 3,195,999
Patented July 20, 1965

3,195,999
COMPOSITION CONSISTING ESSENTIALLY OF CRYSTALLINE UREA COATED WITH SUGAR
Joe I. Chance, Memphis, Tenn., assignor to W. R. Grace & Co., New York, N.Y., a corporation of Connecticut
No Drawing. Filed July 24, 1963, Ser. No. 297,222
4 Claims. (Cl. 71—28)

This invention relates to the treatment of crystalline urea and to the product thereby produced. More particularly this invention relates to crystalline urea having greatly reduced caking properties and to a process for preparing the same.

In summary, this invention is directed to a process for producing substantially non-caking crystalline urea comprising blending about 0.15–0.5% by weight of a sugar selected from the group consisting of sucrose and raffinose onto crystalline urea, and to the resulting coated product.

It is a well-known fact that many organic and inorganic salts and compounds in powdered, crystalline, or granular form have a great tendency to cake and form more or less rigid solid masses when stored for any significant period of time. The ultimate consumer therefore usually must crush or otherwise break up these masses before they can be used for their intended purpose. As an example, the caking tendency of various fertilizer materials necessitates the expenditure of much labor and time in order to render these materials suitable for even distribution in the area to be fertilized and also to avoid or substantially eliminate clogging and jamming of the distribution machinery. Crystalline urea is particularly susceptible to the difficulties mentioned.

Crystalline urea is commercially available in a variety of forms, ranging from long needlelike crystals to rectangular or square-shaped crystals of relatively large size. All such crystalline urea can be treated by the process of this invention to render it substantially non-caking. In the usual plant operations, crystalline urea is dried to a low moisture content (less than about 0.2% by weight) and packaged in multi-ply bags having moisture barriers such as polyethylene film plies or asphalt laminate plies. Regardless of the particular shape and form of the crystals that are dried and packaged in this manner, it is always found that the mass of crystals tends to set up into a single solid cake when stored in the ordinary manner. In some instances, particularly with the needlelike crystals, a hard solid cake is formed in a matter of hours when the bagged urea is subjected to very slight pressures, on the order of 1 to 5 pounds per square inch.

Various methods have been proposed for avoiding the caking problems noted above. One prior proposal has been to completely melt the crystalline urea followed by spraying air into a small stream of the molten mass to form small uniform pellets. Other proposals involve addition of various so-called "anti-caking" agents including such materials as clay, basic magnesium carbonate, or amines. All of these prior proposals have one or more disadvantages, for example: (a) The production of weak and readily disintegratable pellets. (b) The introduction of insoluble or toxic impurities into the urea. (c) The requirement for expensive equipment and/or time consuming processes.

It is an object of this invention to provide a process for treating crystalline urea in order to reduce its tendency to cake. It is a further object of this invention to provide crystalline urea having a substantially reduced tendency to cake. It is still another object of this invention to provide a process for preparing substantially non-caking crystalline urea without the necessity of adding insoluble or toxic impurities thereto. Other objects of this invention will be apparent to those skilled in the art in view of the more detailed disclosure which follows. The substantially non-caking crystalline urea produced by this process is useful in any of the applications where crystalline urea is ordinarily used. It is particularly suitable for use in fertilizer and feed applications, where its non-toxic and substantially non-caking characteristics are of especial importance.

The prior art teaches broadly that the free flowing and non-caking properties of urea can be improved greatly by forming compositions of urea and reducing sugars. I have made the surprising discovery that this teaching is far too broad, because there are noteworthy exceptions to it. For example, although the addition of small quantities (ca. 0.2% by weight) of glucose, a reducing sugar, renders crystalline urea substantially non-caking, I have made the completely unexpected discovery that the addition of a similar quantity of lactose or maltose, reducing sugars, does not render crystalline urea substantially non-caking.

I have also made the more surprising and completely unexpected discovery that the caking tendency of crystalline urea is reduced substantially by the addition of about 0.15–0.5% by weight of either sucrose or raffinose (two non-reducing sugars). This result was unexpected because, prior to my discovery, it was believed that only reducing sugars would decrease the caking tendency of urea. Further, as stated supra, work leading to this invention showed that the addition of maltose and lactose, two reducing disaccharides, has only slight effect on the caking tendency of urea. Accordingly, it was entirely unexpected that the addition of sucrose, a non-reducing disaccharide, or raffinose, a non-reducing trisaccharide, would substantially reduce the caking tendency of crystalline urea.

While I have discovered that the addition of about 0.15–0.5% by weight of either sucrose or raffinose to crystalline urea will render said urea substantially non-caking, I prefer to add about 0.2–0.3% by weight of either of the aforesaid sugars to crystalline urea to render the said urea substantially non-caking.

I have found that the sugar (sucrose or raffinose) can be added to the urea in the form of a dry powder (ca. −100 mesh, U.S. Standard). Alternatively a solution of the sugar can be sprayed over the urea crystals. If the latter procedure is used, the crystals should be dried to their original moisture content (ca. 0.1–0.3% by weight) before bagging.

I have obtained substantially identical results with commercial powdered sugar (sucrose) that contained about 3% starch and with starch-free sucrose. Since starch is non-toxic, urea treated with starch-containing sucrose is acceptable for agricultural uses. However, due to the low solubility of starch, I prefer to use starch-free sugar for treating urea that will be used in chemical syntheses.

While the moisture content of the urea-sugar mixture is not critical, it is obvious that the process of this invention cannot be applied to urea with a moisture content so high the urea is wet. I have obtained equally satisfactory results with crystalline urea containing less than about 0.1% moisture by weight and more than ½% moisture by weight. Thus, the said process is applicable to the crystalline urea of commerce without regard to the moisture content thereof.

The use of sugar (sucrose or raffinose) as an anticaking agent avoids the addition of insoluble or toxic materials to urea. Accordingly, the thus treated urea may be used as a chemical intermediate in syntheses where insoluble materials would be objectionable and as a component of feeds for ruminant animals.

I prefer to use the warehouse stack test to determine the caking tendency of urea, because it substantially approaches actual field storage conditions. In this test, the product is bagged (ca. 100 lbs. of urea to the bag), and the test bags are placed horizontally on a wooden pallet of the type normally used for commercial warehouse storage. The same type of bag is employed as in routine commercial production of the product under test. The bag is filled to the same net product weight (ca. 100 lbs.), and the same bag closure used as is used commercially.

The test bags are arranged on the pallet in a layer of four bags, one bag along each side of the pallet. If there is an insufficient number of test bags to complete a layer on the pallet, additional bags of routine product are added as ballast.

The pallet of test material is then placed in warehouse storage, and weight is added by stacking two full pallets of commercially bagged product, 6 layers of bags per pallet (6×4=24 bags/pallet) on top of it. The test pallet is stored in this condition for 28 days.

At the end of the 28 days storage period, the bags are carefully removed from the pallet and each is dropped once from a height of about 2 feet to separate any loosely held agglomeration of particles that may have formed during storage. Each bag is opened at one end, and its content is poured onto a 2 mesh (U.S. Standard) screen which retains any lumps of caked material that may have formed. The lumps are retrieved and weighed. The weight, in pounds, of cake retained on the 2 mesh (U.S. Standard) screen constitutes a quantitative measure of the urea's caking tendency.

My invention is illustrated further by the following examples which are illustrative only and are not intended to limit the scope of the invention.

*Example 1*

A sample of crystalline urea analyzing 0.12% moisture by weight was used in this example. The caking tendency of the untreated urea and of said urea after treatment with sucrose (ca. —100 mesh U.S. Standard) at three levels (0.05, 0.10, and 0.20% by weight) was determined. Each determination was made in duplicate.

| Sucrose Level, Percent by Weight | "Lumps," Lbs. per 100 Lb. Bag [1] | |
|---|---|---|
| | First Replication | Second Replication |
| None | 100 | 100 |
| 0.05 | 65 | 30 |
| 0.10 | 26 | 28 |
| 0.20 | 1.5 | none |

[1] The term "lumps" means material that failed to pass a 2 mesh (U.S Standard) screen.

*Example 2*

Crystalline urea containing about 0.25% moisture by weight was used in this example. The caking tendency of the untreated urea and of said urea treated with 0.2% by weight of several sugars (lactose, maltose, sucrose, and raffinose) was determined. In each instance, the sugar was added as a powder (ca. —100 mesh U.S. Standard). Results presented in the following table show that the addition of 0.2% by weight of either lactose or maltose (reducing sugars) does not render crystalline urea substantially non-caking, while the addition of this quantity of sucrose or raffinose (non-reducing sugars) renders crystalline urea substantially non-caking:

| Sugar added: | Lumps, lbs. per 100 lb. bag [1] |
|---|---|
| None | [2] 80 |
| Lactose | 45 |
| Maltose | 33 |
| Sucrose | [2] 7 |
| Raffinose | 9 |

[1] The term "lumps" means material that failed to pass a 2 mesh (U.S. Standard) screen.
[2] Variance from comparable data in Example 1 is due primarily to difference in amount of fines and in moisture content of the respective ureas.

*Example 3*

A 91 g. (0.2 lb.) portion of sucrose was dissolved in 150 ml. of water. The resulting solution was sprayed onto a moving bed of 100 lbs. of crystalline urea in a horizontal cement mixer. Subsequent to the addition of the solution, the urea was dried to its original moisture content (ca. 0.25% by weight). The thus treated urea was subjected to the stack test. Only 4 lbs. of said urea failed to pass through a 2 mesh (U.S. Standard) screen.

What is claimed is:

1. Composition consisting essentially of crystalline urea containing about 0.1–0.5% moisture coated with about 0.2–0.3% by weight of a sugar selected from the group consisting of sucrose and raffinose.

2. The composition of claim 1 in which the sugar is sucrose.

3. The composition of claim 1 in which the sugar is raffinose.

4. Composition consisting essentially of crystalline urea containing about 0.1–0.5% moisture coated with about 0.15–0.5% by weight of a sugar selected from the group consisting of sucrose and raffinose.

References Cited by the Examiner

UNITED STATES PATENTS

| 1,768,007 | 6/30 | Sigmund. | |
| 1,950,701 | 3/34 | Spangenberg | 71—62 |
| 2,824,009 | 2/58 | Lindow | 99—141 |
| 2,859,113 | 11/58 | Goodfriend | 99—141 |
| 3,014,783 | 12/61 | Young | 71—64 |
| 3,085,870 | 4/63 | Bradford et al. | 71—64 |
| 3,104,968 | 9/63 | Fisher | 71—1 |

DONALL H. SYLVESTER, *Primary Examiner.*

ANTHONY SCIAMANNA, *Examiner.*